Dec. 31, 1963  M. GREENBAUM  3,115,890
FLOOD CONTROL VALVE
Filed Sept. 18, 1961  3 Sheets-Sheet 1
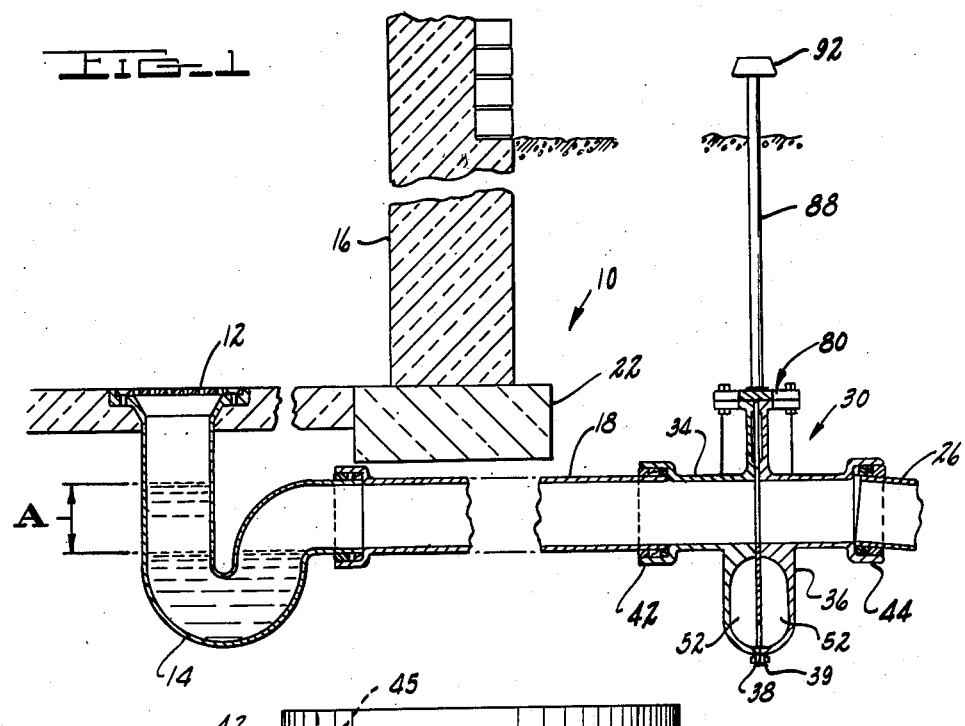
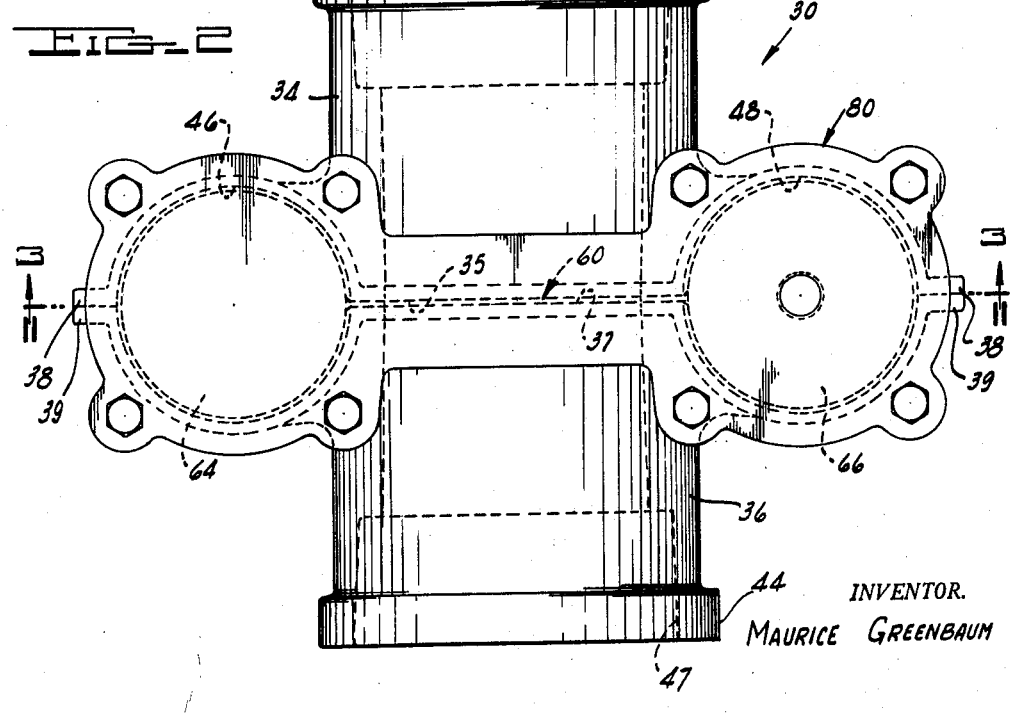
INVENTOR.
MAURICE GREENBAUM Dec. 31, 1963    M. GREENBAUM    3,115,890
FLOOD CONTROL VALVE
Filed Sept. 18, 1961    3 Sheets-Sheet 2

INVENTOR.
MAURICE GREENBAUM

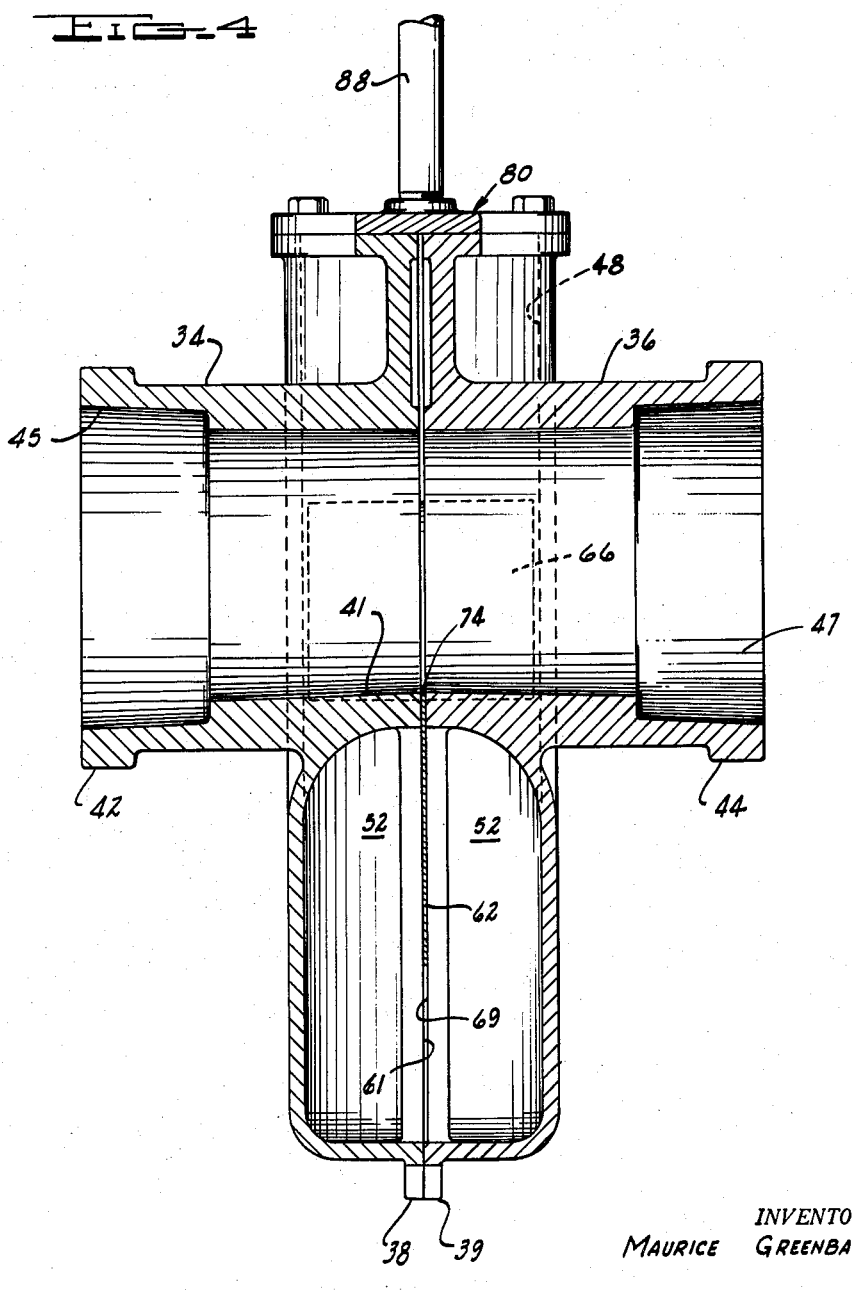

United States Patent Office 3,115,890
Patented Dec. 31, 1963

3,115,890
FLOOD CONTROL VALVE
Maurice Greenbaum, 19481 Strathmoor Ave.,
Detroit, Mich.
Filed Sept. 18, 1961, Ser. No. 140,633
7 Claims. (Cl. 137—423)

The present invention relates to new and useful improvements in valves and more particularly to an automatically actuated back water flood control valve for the prevention of basement flooding which results from overtaxation of the metropolitan sewer system during severe rain storms and other similar situations resulting in the impairment of the sewer system.

In past years, many flood control devices have been proposed in an attempt to eliminate basement flooding during storms. However, to date, because of cost and generally the unsatisfactory operation of the proposed devices, installation of flood control devices has been very limited.

Pumps have been installed in recent years in both city and suburban areas to help eliminate basement flooding, however, when the weather is such that the sewers back-flow, the pump provided is more often than not, inadequate to pump a sufficient volume of water fast enough to eliminate flooding.

Several types of ball check valves and swing gates have been developed and used to prevent back-flow. A single unit is installed in each outlet (floor drain or toilet) where back-flow might occur. This type installation has been moderately successful where the sewer lines below the basement floor are properly joined, but when these lines are not watertight, the hydraulic pressure created below the floor, causes the floor to heave. The basement then floods with consequent damage in excess of that which would have occurred had the control device not been installed.

Various forms of manually operated gate valves have been successfully used to prevent flooding, however, the drawback is the necessity of having an operator available to operate the gate in the event the sewer backs up. Since there is no human control over when the need for closing the gate might occur, severe flood damage can be encountered even though the building is equipped with the protective device which can prevent a flood.

It is therefore a primary object of the present invention to provide a flood control valve which will not impair normal sewer function, but will provide an automatic shut off of the sewer line in the event of back-flow.

Another object of the invention is the provision of a flood control valve which is simple, durable, inexpensive and can be manufactured by modern mass production methods which requires a minimum amount of tooling.

Still another object of the present invention is the provision of a flood control device which will require a minimum amount of maintenance, thereby providing trouble free operation.

Another object of this invention is the provision of a flood control valve which can be readily installed in a new, as well as any old, plumbing system.

Still another object of the present invention is the provision of a flood control valve which can be installed in a sewer line outside the building, eliminates the possibility of damage to the floor under the building, should back-flow occur.

These and other objects can be accomplished by the provision of a flood control valve having a two part body split along the vertical center line, each of said body sections being of generally symmetrical configuration; a hollow flanged hub on each of said body sections which extends at sustantially right angles thereto; one face of each body section having a flat face in the central portion thereof, so as to provide a predetermined vertical space intermediate said body sections for receiving a thin, flat buoyant member with floats secured thereto; stop means in said body sections for limiting travel of said thin, flat buoyant member; a hollow cavity disposed beneath said buoyant member for receiving foreign material passing through said vertical space intermediate said body sections; a vented cover on said body exposed to the atmosphere to permit unobstructed travel of said buoyant member, said cover removable for disassembly and clean-out of any foreign material collecting in said hollow cavity; one of said hollow flanged hubs joined to the sanitary plumbing system of a building, the remaining hollow flanged hub joined to a sewer system; back-flow of said sewer filling said body sections and the reservoir created by the plumbing which forms the sanitary system, thereby displacing said buoyant member to obstruct the passage between said hollow flanged hubs, the back-flow maintaining said passage closed until normal sewer function occurs, at this time the upper portion of the body housing drains, which permits the buoyant member to return to the open position, to restore normal operation of the sanitary system.

Other objects of this invention will appear in the following description and appended claims, reference being had to the accompanying drawings, which form a part of this specification, wherein like reference characters designate corresponding parts in the several views.

In the drawings:

FIGURE 1 is a schematic illustration of a sanitary plumbing system with the flood control valve of the present invention installed therein.

FIGURE 2 is a top view of a flood control valve which embodies the present invention.

FIGURE 4 is a cross sectional view taken substantially along lines 4—4 of FIGURE 3.

Figure 3:
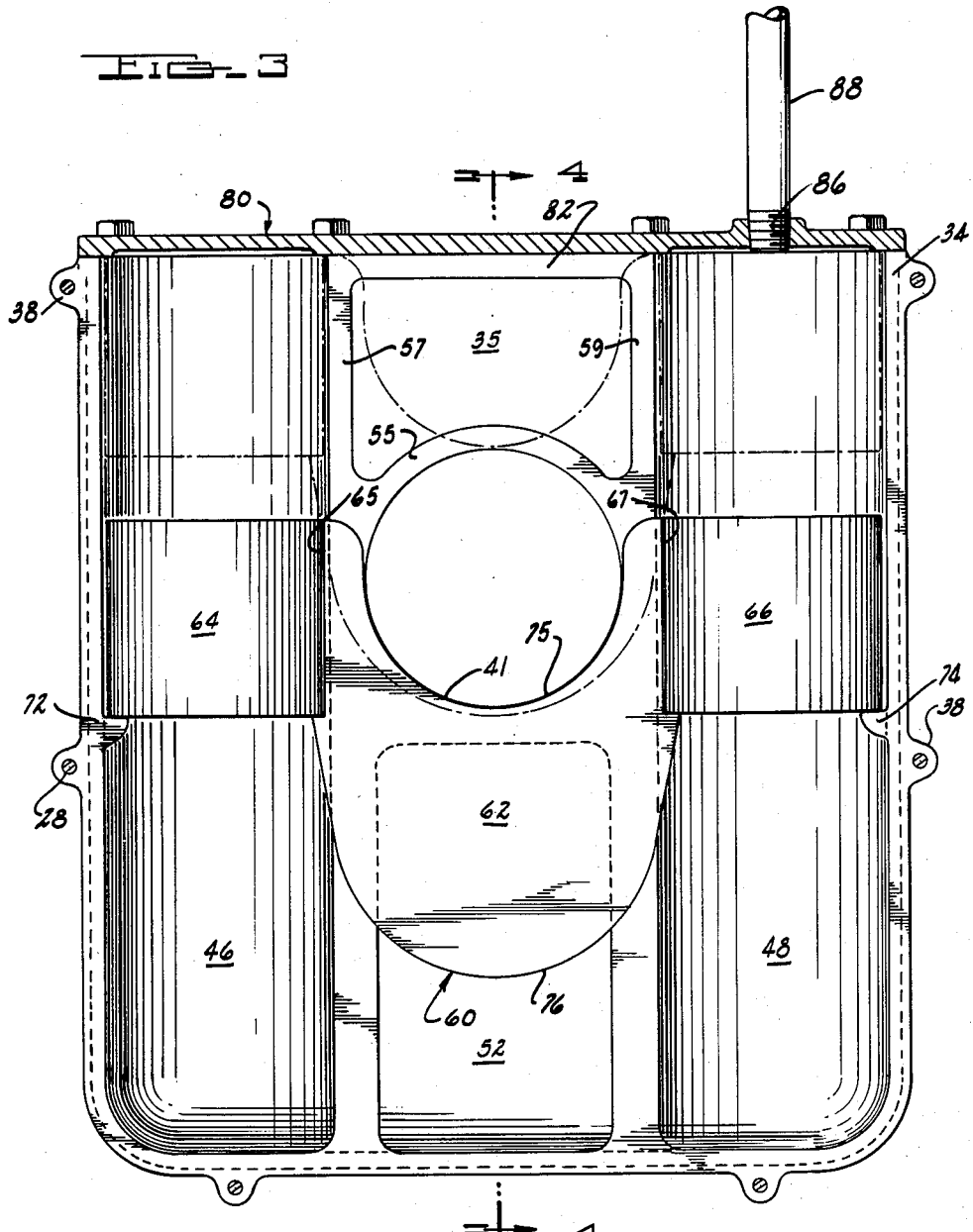
FIGURE 3 is a cross sectional view taken substantially along lines 3—3 of FIGURE 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not limitation.

Referring to the drawings, FIGURE 1 illustrates a schematic drawing of a typical floor drain in a sanitary plumbing system 10. The floor drain 12 has a water trap 14 therein to prevent the passage of air or gas in either direction, thereby eliminating the passage of sewer gas through the room in which the floor drain 12 is located. The schematic drawing shown in FIGURE 1 illustrates the floor drain 12 immediately adjacent a basement wall 16 with the outlet thereof connected to a pipe 18 which runs below the footing 22 of the building. The flood control valve assembly 30 which embodies the present invention is shown intermediate the sanitary pipe 18 and the sewer line 26. The flood control valve is adapted to be mounted in a substantially vertical position, with the vent stack 32 extending upwardly therefrom. The operation of the flood control valve will be explained hereinafter.

FIGURE 2 of the drawings shows a top view of the present flood control valve assembly 30. The complete valve structure is comprised of four basic parts, namely, a two part body 34 and 36, a thin flat buoyant gate member adapted to be interposed between said two part body 34 and 36, and a vented cover member 80.

Each of the two body sections 34 and 36 are of the same general symmetrical configuration. The inner faces 35 and 37 thereof are flat, with the central portion thereof undercut a sufficient amount to receive the thin, flat buoyant gate 60, when the body sections 34 and 36 are joined together. A plurality of generally triangular shaped flanges 38 extend outwardly from the perimeter of the body section 34, while similar flanges 39 extend outwardly from body section 36. Each of said flanges having an opening therethrough which is in alignment with its respective counterpart. The flanges 38 and 39 are joined by bolts 28 when both body sections 34 and 36 are brought together to form an assembly.

A hollow flanged hub 42 of generally cylindrical configuration extends at substantially right angles to the flat surface 35 on body section 34, while a similar flanged hub 44, which is hollow, extends at right angles from the flat surface 37 on body section 36. The outer end of each hub is recessed. The recess 45 is found in the hub 42 while recess 47 is found in hub 44. Each of the recessed sections 45 and 47 is of the same configuration and dimension as the flanged hubs found on standard sewer pipe now in use.

Immediately adjacent each of the flanged hubs 42 and 44 are two cavities 46 and 48, one half of each cavity being located in each of the respective body sections 34 and 36. This is best viewed in FIGURE 3 of the drawings.

It is readily apparent from the drawing, that the cavities 46 and 48 are spaced from each other and that they are in generally parallel relationship. In each body section, it will be noted that each of the cavities 46 and 48 therein is of substantially semi-circular cross section. The body portion between the cavities being generally flat, the area surrounding the opening 41 in the hub 42 has a narrow circumferential flat land 55 therebout, with another land 57 and 59 extending vertically above and below the circumferential land 55, along the inside edges of the cavities 46 and 48. Below the opening 41 in the hub 42, a large reservoir 52 is provided which communicates cavities 46 and 48 with each other.

A stop 72 depends inwardly from the edge of cavity 46, while a second stop 74 depends inwardly from the edge of cavity 48. Each of said stops 72 and 74 are of similar shape and dimension and located in a corresponding position in each respective cavity.

When the two body sections 34 and 36 are joined together to form the valve body assembly 30, a thin, flat buoyant assembly 60 is interposed therebetween (FIGURES 1-4). The complete float assembly 60 is made from a corrosive resistant material, so as to assure long trouble free life.

The configuration of the flat gate body 62 is best shown in FIGURE 3 of the drawings, wherein the central portion is located below the opening 41 in hub 42, while two float members 64 and 66 are located in horizontal alignment therewith. The float members are hollow and are secured to the outer vertical edges 65 and 67 of the gate body 62. The vertical travel of the complete float assembly 60 is guided by the float members 64 and 66 within the cavities 46 and 48 while the flat gate body 62 is guided between the flat surfaces 35 and 37 between the two body sections 34 and 36. The lower limit of travel of the float assembly 60 is controlled by the engagement of the floats 64 and 66 with the stops 72 and 74, while the upper limit of travel is controlled by the cover 80.

The upper edge 75 of the thin, flat gate body 62 is semi-circular in shape and is of identical configuration to the opening 42 of hub 42. The lower edge 76 of the gate body 62 is convex in shape and of considerably larger dimension than the opening in the hubs. The area of the body 62 is of sufficient size to cover the entire opening 41 when the proper conditions are satisfied, which conditions will hereinafter be described.

The configuration of the gate body 62 is of course optional, since many shapes could be used without departing from the teaching of the invention. This is also true for the shape of the floats 64 and 66 and the cavities 46 and 48 which contain them. The size and shape of the buoyant assembly being controlled by the size of the sewer in which the valve assembly is located.

The vented cover 80 is of one piece construction and of such configuration to enclose the top 82 of the two body sections 34 and 36 and is secured thereto by nuts and bolts or any other closure means which will permit the removal thereof. Although the cover member 80 has been disclosed as being separate from the body sections 34 and 36, it is to be understood that the body sections 34 and 36 could have the top portion integral therewith. If the top is integral with the body sections, complete removal and disassembly of the valve would be required in the event cleanout were necessary. However, in either case, an atmospheric vent is provided in the valve top or cover. In the present valve cover 80, a threaded opening 86 is provided and an atmospheric vent stack 88 secured therein (FIGURE 1). A cover 92 is located on the end of the stack 88 to prevent same from becoming obstructed by material which might be deposited therein by children. The use of an atmospheric vent stack permits the float member to operate freely in either direction, without restriction as is caused by air or vacuum lock.

*Operation*

When the complete valve assembly 30 of the present invention is installed in a plumbing system 10, the body is mounted in a generally vertical position substantially at right angles to the sanitary outlet pipe 18 of the plumbing system 10. Sewage passes through the inlet hub 42, over the gate body 62 and through the outlet hub 44 and into the sewer line 26. The vertically disposed cavities 46 and 48 adjacent the inlet and outlet as well as the reservoir 52 below the hubs, fill with water which escapes through the openings 61 and 69 on each side of the gate body 62 positioned between the flat surfaces 55, 57 and 59 respectively on each of the body sections 34 and 36. The reservoir 52 fills only to the height of the bottom level of the hub openings 41, as long as no backflow occurs in sewer line 26. However, during normal operation of the sewer system, it will be understood that at times (such as flushing a toilet—draining a laundry or bath tub, etc.) the water level in the sewer outlet will rise. While this is true, the time element for such flow to occur and the height to which the water level will rise due to the inherent leakage between the openings 61 and 69 (FIGURE 4) is not such that any obstruction of the normal sewer flow will occur. This is true because of the weight of the float assembly, as well as the fact that only a very slight rise in the water level occurs in the sewer line. Only a slight rise occurs because of the low discharge capacity of the various pipes which are conected to the outlet, as compared with the outlet discharge capacity. Another factor tending to limit the height rise in the sewer outlet is the normal frictional flow encountered in the passage of water, etc., therethrough.

To effect a stoppage of flow through the sewer, the water must rise a sufficient amount as to cause the complete float assembly to rise, which situation does not occur in the present instance. It must also be understood that when the sewer flow above described stops, the water which has passed through the openings 61 and 69 will then have a reverse flow and thereby return the water level in the reservoir 52 to the bottom level of the hub opening 41 in the sewer line. When back-flow of line 26 does occur, the sanitary system 10 fills to the height of the top level (A) of the hub openings 41, thereby filling the remainder of the cavities 46 and 48. The floats 64 and 66 then move off the stops 72 and 74 moving the gate body upward to close the sewer passage off and thereby prevent further back-flow. The back-flow pressure maintains the flat gate body 62 against the flat surfaces 55, 57 and 59 against the inlet hub body 42 until the back-flow subsides.

When the back-kow subsides in line 26, the cavities 46 and 48 drain by the escape of water through the aforementioned passages 61 and 69. This permits the buoyant gate assembly 60 to move down, thereby draining the reservoir created by the sanitary plumbing system 10. When sufficient water has escaped through passages 61 and 69 and the sanitary system to permit the floats 64 and 66 to engage the stops 72 and 74, normal sewer function is obtained. Both the open and closed positions of the gate assembly 60 are shown in FIGURE 3 of the drawings, the open position being illustrated in solid lines, the closed position being shown in phantom lines.

The passages 61 and 69 between the body sections 34 and 36 are very limited, so that a minimum amount of foreign material, as will be found in a sewer, will find its way into the valve body proper. Any foreign material in this area tends to obstruct the free operation of the buoyant gate assembly 60. However, should any foreign material find its way into the valve body proper, it will be received in the reservoir 52 which communicates cavities 46 and 48. Since this reservoir is quite deep, impairment of the free movement of the buoyant assembly 60 is very remote. If, for any reason cleanout or repair of the flood control valve assembly is required, the valve assembly 30 is exposed and the cover 80 removed, thereby permitting inspection, cleanout and removal or repair of the buoyant gate assembly 60.

From the foregoing description, it will be apparent that the flood control valve of the present invention is simple, durable and readily serviceable. The complete assembly can be manufactured from cast iron, steel, brass, bronze, aluminum, magnesium, etc., and can be installed in new as well as old plumbing systems to provide automatic flood control in the event of sewer line back-flow. The flood control valve assembly 30 will provide long trouble free service. Should maintenance be required, the valve can be quickly disassembled, inspected and repaired by any mechanic familiar with the metal working trades.

Having thus described my invention, I claim:

1. In a flood control valve for use in a sanitation system, the combination of, a two part body of generally symmetrical configuration; a hollow flanged hub on each of said body parts; a pair of float cavities in said two part body; a pair of float members mounted on a vertically moveable gate, said vertical gate positioned intermediate each of said body sections and the float members in the float cavities; the flanged hub on one of said body parts secured to a sanitary plumbing system, the other hub secured to a sewer, back-flow of said sewer filling said float cavities and the reservoir created by the piping which forms the sanitary plumbing system to raise said vertical gate and obstruct the back-flow.

2. A device as in claim 1, wherein the float cavities are located in spaced relationship and vertically positioned on opposite sides adjacent the flanged hubs.

3. In a flood control valve, the combination of, a multiple section body, two of said sections being of generally symmetrical configuration; a hollow flanged hub extending outwardly from each of two body sections, said flanged hubs being in alignment with each other; a cylindrical cavity located on each side of said flanged hubs, and separated by the passage through said hubs; a pair of float members secured to a generally flat vertical gate, in spaced relationship, and adapted to be received within said cylindrical reservoir cavities in said body, the flat body of said gate extending at substantially right angles to the passage through said hubs; the flanged hubs secured to a sanitary plumbing system and sewer respectively, backflow of said sewer operating to automatically close said gate when sufficient flow fills said cylindrical cavities and the reservoir created by the sanitary plumbing system thereby causing the vertically disposed gate to close.

4. A device as in claim 3, wherein stop means are provided to limit travel of said gate member.

5. A device as in claim 3, wherein a cavity is provided beneath said gate for foreign material which might obstruct the free movement of said vertical gate.

6. A device as in claim 3, wherein a cavity is provided beneath said floats and said gate to contain any foreign material which could obstruct the free movement of said floats and said vertical gate.

7. In a flood control valve for use in a sanitation system, the combination of, a two part body, each part of symmetrical configuration; a hollow flanged hub on each of said body sections, one forming a sewage inlet, the other forming a sewage outlet; a flat inner surface on each of said body sections; said body sections joined together in spaced relationship, the flat inner surfaces of said body sections providing a guide for a thin, flat vertically disposed buoyant gate interposed therebetween; means in said body for limiting travel of said buoyant gate; receiving means beneath said buoyant gate for any foreign material which might obstruct the free movement of said buoyant gate; and a cover on said two part body to permit disassembly and cleanout of any foreign material; said flanged inlet connected to a sanitary plumbing system, while said flanged outlet is connected to a sewer, back-flow of said sewer operating to fill the reservoir created by said sanitary plumbing system, thereby actuating said vertically disposed buoyant gate to obstruct the passage through said valve.

References Cited in the file of this patent

UNITED STATES PATENTS

| | | |
|---|---|---|
| 899,659 | Craddock | Sept. 29, 1908 |
| 972,441 | Durdin | Oct. 11, 1910 |
| 1,861,397 | Khun | May 31, 1932 |
| 2,431,640 | Gordon | Nov. 25, 1947 |
| 2,464,456 | McGillis et al. | Mar. 15, 1949 |
| 2,549,204 | Kaddatz | Apr. 17, 1951 |